United States Patent
Kang

(10) Patent No.: US 7,492,926 B2
(45) Date of Patent: Feb. 17, 2009

(54) METHOD FOR IDENTIFYING A PERSON FROM A DETECTED EYE IMAGE

(75) Inventor: Pil Kyung Kang, Seoul (KR)

(73) Assignee: IDTeck Co., Ltd, Seoul (KR)

( * ) Notice: Subject to any disclaimer, the term of this patent is extended or adjusted under 35 U.S.C. 154(b) by 624 days.

(21) Appl. No.: 11/170,601

(22) Filed: Jun. 29, 2005

(65) Prior Publication Data

US 2007/0019842 A1    Jan. 25, 2007

(30) Foreign Application Priority Data

May 16, 2005    (KR) .................... 10-2005-0040633

(51) Int. Cl.
*G06K 9/00*    (2006.01)
(52) U.S. Cl. .................... 382/117; 382/118; 382/209; 382/216
(58) Field of Classification Search ............ 382/117, 382/118, 209, 216
See application file for complete search history.

(56) References Cited

U.S. PATENT DOCUMENTS 5,859,921 A * 1/1999 Suzuki .................... 382/118
6,885,761 B2 * 4/2005 Kage .................... 382/118
7,092,555 B2 * 8/2006 Lee et al. .................... 382/118

* cited by examiner

*Primary Examiner*—Matthew C Bella
*Assistant Examiner*—Mike Rahmjoo
(74) *Attorney, Agent, or Firm*—G W i P S

(57) ABSTRACT

A method for identifying a person from the detected eye image has been developed, the steps of which are: (a) discriminating the image difference by comparing the detected personal eye image with the simple background scene, and compressing the corresponding discriminated eye image; (b) decoding the compressed image to the binary coded image by utilizing multi-critical values; (c) defining only the bright region of the binary coded image as the surveying area; (d) generating the histogram for the surveying area; (e) comparing the specified histogram of the surveying area with various pre-stored templates to sort-out the similar facial groups and pick at least one similar eye region among the similar facial groups, and (f) determining the best matched eye appearance through the character analysis of the selected similar eye regions.

4 Claims, 6 Drawing Sheets

METHOD FOR IDENTIFYING A PERSON FROM A DETECTED EYE IMAGE

BACKGROUND OF THE INVENTION

1. Field of the Invention

The present invention relates to a method for identifying a person from a detected eye image. More particularly, the eye position is promptly and effectively identified from the detected facial image through the character analysis of selected similar eye regions.

2. Related Prior Art

Generally, a face recognition method is a typical technology adopted conventionally for identifying a person at a surveillance check point. However, this conventional method has a disadvantage when checking a person who bears a faked ID. Therefore, it is required to develop an advanced technology for recognizing true identity. As the demand increases, research is actively undergoing for developing an eye recognition technology from a detected image through a watching camera. The eye recognition technology takes advantage of a human feature that has a unique organic pattern, similar to a fingerprint or iris.

The eye recognition technology can be applied to various security systems, such as an entrance of an apartment, private residence or office, car door, automated teller machine, or membership-club where the verification of the user is required. Recently, the eye recognition technology continues to be researched for combining with the conventional IC/magnetic/RF card reader and fingerprint recognition technology The eye recognition technology adopts the method of discriminating the detected image. The search object detected from the watching camera is discriminated from the background image for effectively identifying a person. The discriminating value of the background image without object has a lower pixel value than that of the background image with object. Thus, it is possible to effectively trace the object if the discriminated image is decoded to a binary coded image through a proper critical value.

The eye recognition method adopts the template technology for matching face images from the search regions. The method of eye recognition is performed using the conventional method of template matching to compare the detected image with a template to search the similar image positions. This technology is widely used for searching the face image regions in the field of face recognition technology. Only the face portion is separated from the images of a person with background for searching the face images.

The conventional face recognition technology adopted a template matching method that scans over the entire face to pick out the similar face shapes among the pre-provided various facial shapes. The detected image pixel value is compared with the template image pixel value while scanning over the entire face image to match a similar face shape.

Because the effect of the background illumination varies depending on the place and time, it is necessary to adjust the brightness value of the face images. Thus, the face image taken through a watching camera performs the specified histogram with a standard brightness to eliminate the effect of the background illumination. The specified histogram is generally used to evenly distribute the brightness and reduce the effect of the background illumination.

However, the conventional method of face recognition has disadvantages in that it is difficult to distinguish between the object and the background. The searching speed is also very slow because it is necessary to scan over the entire face for all templates. The accuracy of the searching is poor because the template matching process does not count the effect of the background illumination

SUMMARY OF THE INVENTION

To overcome the aforementioned disadvantages, a method for identifying a person from a detected face image of the present invention is provided.

The objective of the present invention is to provide a method comprising the steps of: the image difference is discriminated between the detected personal image and the simple background image. The discriminated image is compressed to be a minimized size. The compressed image is decoded to a binary coded image by utilizing multi-critical values. The bright portion of the face image is evaluated to define the searching region. The histogram is generated in the searching region through the entire process. The specified histogram of the searching region is compared with the various templates to search for similar facial regions and select at least one similar eye region among the similar facial regions. The best matched eye position is determined through local feature analysis of the selected similar candidate eye region image.

DETAILED DESCRIPTION OF THE PREFERRED EMBODIMENT

In order to accomplish the aforementioned objectives, a method for identifying a person from the detected eye image of the present invention has been developed. The method comprises the steps of: (a) discriminating the image difference between the detected personal image and the simple background scene, and compressing the discriminated image to a smaller size; (b) decoding the compressed image to a binary coded image by utilizing multi-critical values; (c) defining only the bright portion of the binary coded image as the searching region; (d) generating the histogram for the surveying region through the entire process; (e) comparing the specified histogram of the searching region with the various templates to sort-out the similar facial regions and select at least one similar eye region among the similar facial regions; and (f) determining the best matched eye position through the characteristic analysis of the selected similar eye region.

Hereinafter, the preferred embodiments of the present invention will be described below with reference to the accompanying drawings.

Figure 1:
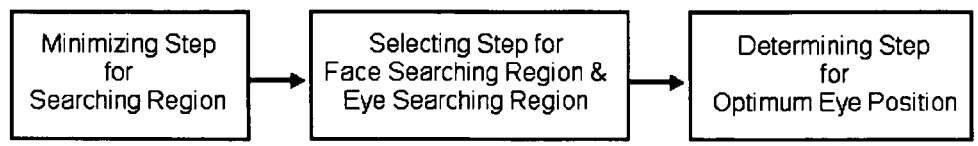
FIG. 1 is an overall block diagram for identifying a person from a detected eye image according to an implementing example of the present invention.

As shown in FIG. 1, an overall block diagram for identifying a person by detecting an eye image is presented. According to a person identifying technology of the present invention, the first unit shows that the detected personal image is discriminated between the detected image and the simple background scene. The discriminated image is compressed to minimize the size of the searching regions. The second unit establishes the facial region as the searching region and identifies the eye image region. At this point, the specified histogram is used to diminish the effect of the background illuminations during the template matching process. The third unit shows that the best matched eye position image is determined through the Local Feature Analysis (LFA) of the selected similar eye region images.

Figure 2:
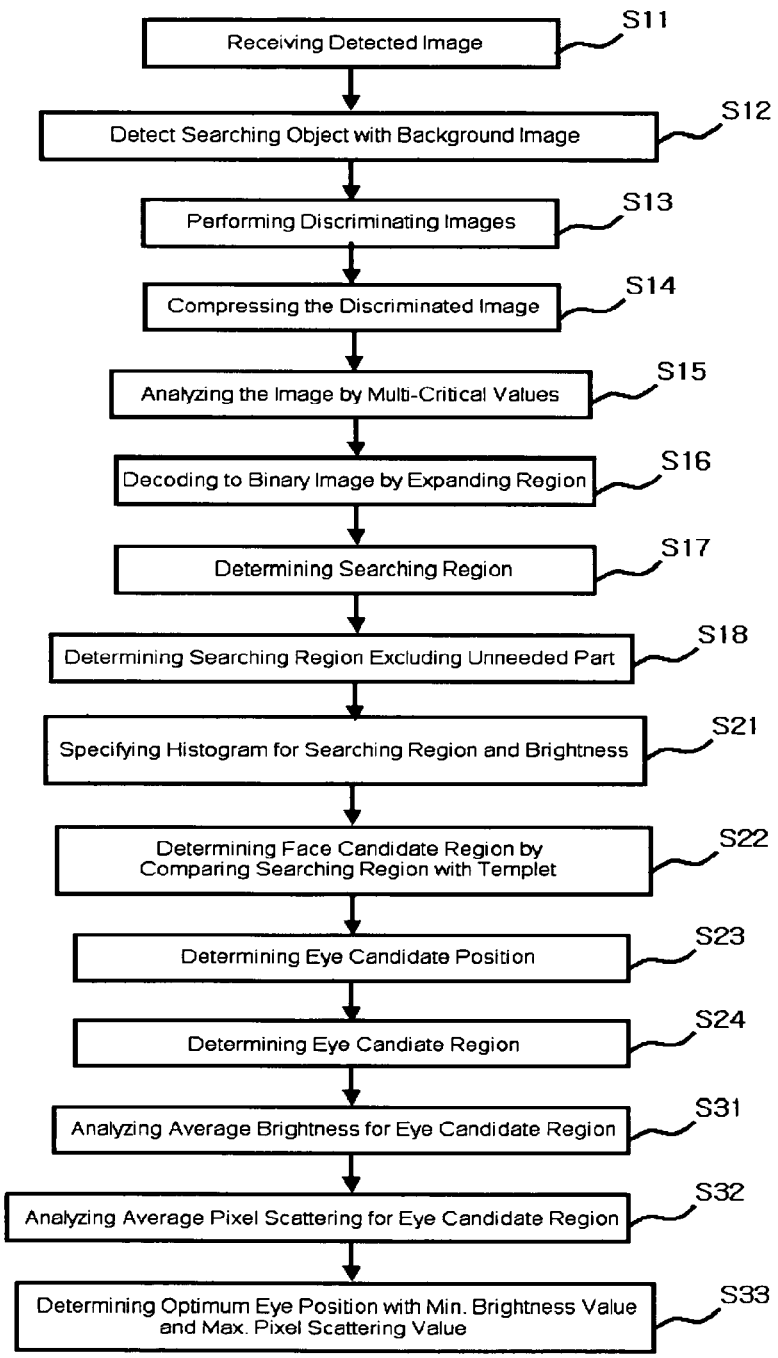
FIG. 2 is a flow chart for identifying a person from a detected eye image according to an implementing example of the present invention.

As shown in FIG. 2, a flow chart for identifying a person from a detected eye image is presented. Hereinafter, a detailed process for identifying a person from a detected eye image is explained as follows: in the first step, the discriminated image is coded to reduce the watching region to the searching region. When a visitor actually appears in the field of view of a watching camera, the background images, excluding the visitor's facial image, are duplicated. The watching system receives a continuous image through a watching camera (S11). At the same time, the facial image and the background image are taken through the watching camera to transmit to the system (S12).

Figure 3A:
FIG. 3a is a background scene according to an implementing example of the present invention.
Figure 3B:
FIG. 3b is a visitor scene according to an implementing example of the present invention.
Figure 3C:
FIG. 3c is a compressed discriminating image according to an implementing example of the present invention.

As shown in FIGS. 3a and 3b, a background image and a visitor's facial image taken by the watching camera are presented for an implementing example. When a visitor appears inside the field of view of the watching camera, the boundary between the detected facial image and the background image is discriminated (S13). This discriminated image is compressed to reduce the size. For instance, the size can be reduced to 1/7 (S14) of the original size. As the size is reduced, the picture quality of the image deteriorates. However, the reduced image quality does not affect the process of decoding a binary coded image by utilizing multi-critical values (3c), as shown in FIG. 3c. The binary coded image has the advantage of accelerating the searching speed of the entire process and effectively matching the template for searching regions. When the binary coding is decoded for the corresponding reduced image, multi-critical values are used, i.e. two critical values may be used. Because the intensity of the background illumination around the watching camera varies every second, the searching object may not be distinguished properly if the detected image is decoded by only one critical value. That is the reason why the two critical values are adopted for decoding the binary code to diminish the sensitivity to the background illumination.

At this point, the critical value "1" is set to a value of 10, and the critical value "2" is set to a value of 30. When an analysis of the absolute value of the discriminated image is below the critical value "1", the output pixel value "0" is determined. If the analysis is between the critical values "1" and "2", the output pixel value "128" is determined. If the analysis is above the critical value "2", the output pixel value "255" is determined (S15).

Figure 3D:
FIG. 3d is a result of discriminating image analyzed through the two critical values according to an implementing example of the present invention.

As shown in FIG. 3d, an analysis result of the discriminated image analyzed by the two critical values is presented. According to the result of the image analysis, the system searches the related component of the surrounding pixels for the pixels with a value of "128". Then, the corresponding pixel value is decoded to the binary code by reassigning the pixel values to either "0" or "255". After completing this process, the expanding process is performed from the lowest pixel energy value of the region between the pixel value "0" or "255".

At this point, the standard reassignment rule is as follows: if a pixel value "128" lies next to the pixel value "0", the corresponding pixel value "128" is re-set to the pixel value "0". If a pixel value "128" lies next to the pixel value "255", the corresponding pixel value "128" is re-set to the pixel value "255." If the image boundary has a pixel value "128", the next region of the pixel value "0" is re-set to the pixel value "0", and the next region of the pixel value "255" is re-set to the pixel value "255".

Figure 3E:
FIG. 3e is a binary coded image connected to the similar image groups according to an implementing example of the present invention.

As shown in FIG. 3e, the pixel value is re-set to a binary coded image connected to the similar image regions. Through re-setting the pixel value, the detected image is clearly distinguished from the surrounding background objects. So, the unclear images with the similar pixel values can be expanded to decode the distinguishable images by emphasizing the boundary configuration.

Figure 3F:
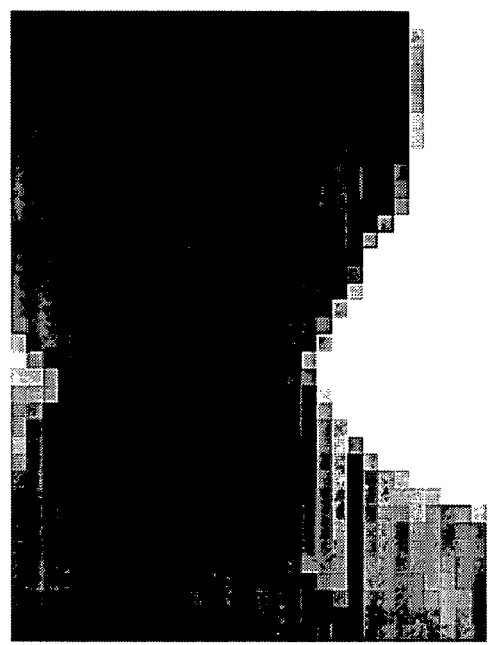
FIG. 3f is a sensed image of the searching region according to an implementing example of the present invention.

After decoding the binary image, the bright portion of the binary image is selected as the searching region (S17). As shown in FIG. 3f, the binary image is compressed to minimize the searching region.

In order to specify the searching region, the eye recognition system counts the number of pixels within the searching region starting from the first incidence of the pixel value "255" and ending when the pixel value "0" occurs again. Some regions where the counted pixel values exceed certain are excluded from the search area. Then, the eye recognition system selectively performs the image searching for the specified searching region (S18).

For example, the numbers of contiguous pixels that have pixel values "255" in the horizontal direction are scanned from the binary coded images for selecting the regions having a minimum of 15 pixels to a maximum of 35 pixels. Then, the pixel numbers of the pixel values "255" in the vertical direction are scanned from the binary coded images for selecting the face regions having a minimum of 15 pixels to a maximum of 45 pixels.

Through the specifying process, the binary coded image will not be affected by the background illumination. Because the discriminated image is compressed to a minimized size, the searching region is possibly reduced. Thus, the processing speed for matching the template is improved. The probability of mistakenly searching regions other than the face region is also reduced.

The second stage of the face recognition region is for the eye recognition region. Then, the eye position is assumed from the face recognition region by matching to the template.

Next, the searching region applies the specified histogram before comparing to the various templates (S21). The specified histogram can diminish the effect of the background illumination. Because the brightness of the background illumination varies depending on the place and time, the face image appearing on the screen looks different, even if it is the same person being checked. Thus, it is necessary to establish the constant brightness of background illumination for taking clear face images. If the face image taken through the watching camera is processed with the histogram of standardized brightness, the face image is clearly distinguished for easily performing the template matching process.

The histogram is used for the image that has high contrast of the brightness. First the proper histogram is selected based on the input image and second the specified histogram is applied.

Figure 4A:
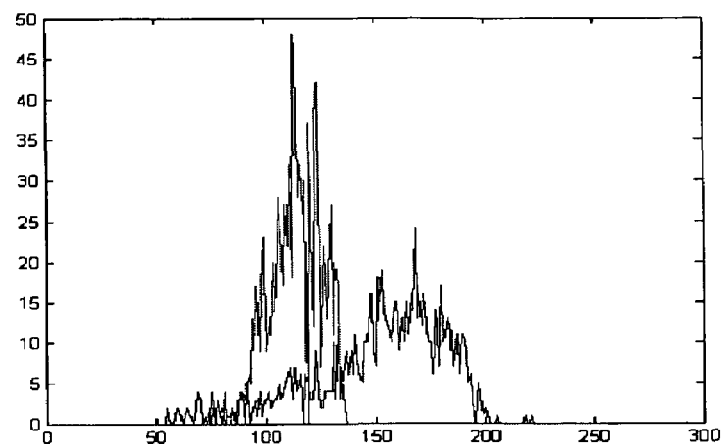
FIG. 4a is a specified histogram for the bright region of the detected image according to an implementing example of the present invention.
Figure 4B:
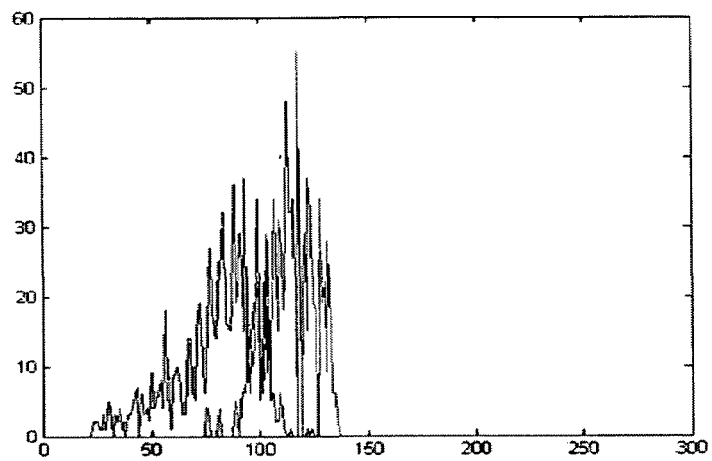
FIG. 4b is a specified histogram for the dark region of the detected image according to an implementing example of the present invention.
Figure 4C:
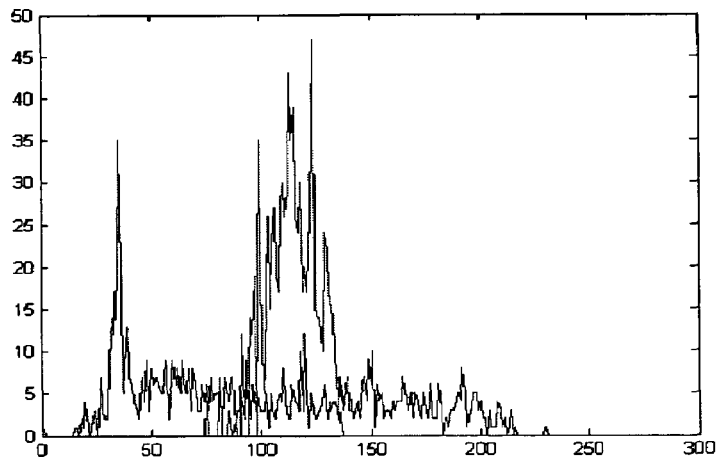
FIG. 4c is a specified histogram for the polarized light region of the detected image according to an implementing example of the present invention.

As shown in FIGS. 4a, 4b and 4c, the specified histograms for the bright region, the dark region, and the polarized light region of the detected images are presented.

If an image appears with one side bright, the brightness can be evenly distributed over the image through the specified histogram. Then, the system performs the template matching process for the face searching region. (S22)

Because the face size appearing on the screen is different depending on the distance from the watching camera to the person, various sizes of template are used. For example, the template sizes of 14×14, 16×16, 18×18, 20×20, 22×22, and 24×24 are provided for the various pixel sizes. During the template matching process, similar face images are selected from among the library of face regions. To simplify the template matching process, the unnecessary portions of the face image, such as the nose and mouth are eliminated from the selected face images. The hair and glasses are also eliminated from the selected face images. These eliminated portions correspond to the periphery of two row pixels and two column pixels on the facial image region. For the darkest portion between the left and right face image, a possible eye position is selected from the finally selected image region. Then, the real eye position is determined by restoring the original images (S23). Hereby, the distances between the left and right eyes are measured by analyzing the eye position of the detected image region and selected image regions (S24).

Figure 5:
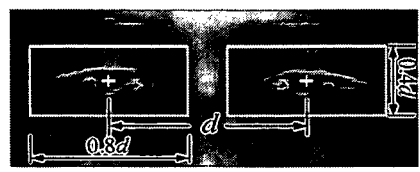
FIG. 5 is a method for comparing the eye region to the eye position of the similar image regions according to an implementing example of the present invention.
Figure 6:
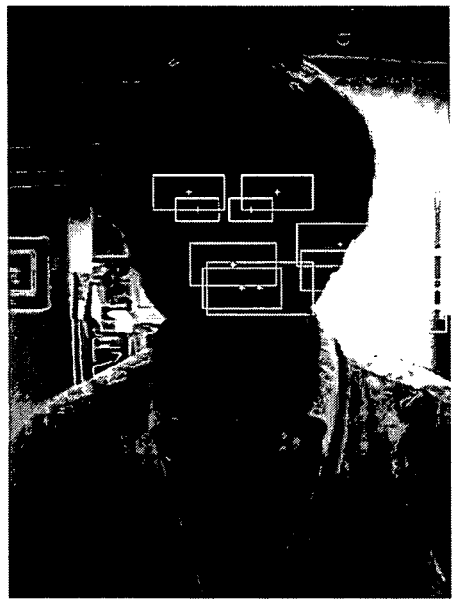
FIG. 6 is a plurality of detected eye regions matching the eye position according to an implementing example of the present invention.

As shown in FIG. 5, a method for selecting the possible eye position is presented for searching for the real eye image among the similar eye image regions. The eye position is determined by proportionally adjusting the scale of the measured eyes (for instance, 0.8d) depending on the distances (d) between the left and right eyes. When the eye position is determined, the eye region is expanded to the left or right, upwards or downwards with respect to the corresponding positions. As shown in FIG. 6, a plurality of possible eye positions selected from the face region is presented.

On the other hand, the last three steps are related to the determination of the final eye position. The Local Feature Analysis (LFA) is adopted for determining the final eye position among the candidate eye regions. Two local features of the eyes are used for determining the final eye position: that the eye is darker than the surrounding region, and that the pixel value of the eye varies quickly.

Accordingly, the system utilizes one eye feature, that the eye is darker than the surrounding region. The average value of the brightness is calculated for the candidate eye region that is 5 pixels by 5 pixels, centered around the center of the eye position. The average values of the brightness are evaluated for the surrounding regions that are 5 pixels apart to the left, right, above and below around the center eye position of the 5×5 pixel block (S31). The analysis of the average brightness is performed for all other eye candidate regions.

The system further utilizes a second eye feature that the pixel value of the eye varies rapidly.

Due to the rapid scattering of light, the pixel value of the eye varies quickly. Therefore, each row and column of the candidate eye region is calculated for estimating the overall average scattering value of the light (S32). The analysis of the light scattering is performed for all other candidate eye regions.

Finally, the optimum eye position is determined based on the LFA result of average brightness and the light scattering for the candidate eye regions. Based on the analysis of the candidate eye regions, the eye position is selected in which the brightness value is less than the average value of the surrounding regions. For the analysis result of the pixel scattering value, the eye position with the highest scattering value is selected from the candidate eye regions.

Finally, the eye position which satisfies both the brightness value and scattering value criteria is selected from the candidate eye regions.

Figure 7:
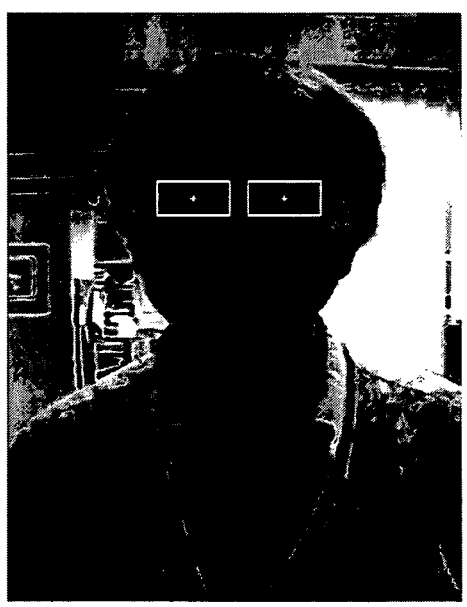
FIG. 7 is an optimum eye position matched through the character analysis of the selected similar eye regions according to an implementing example of the present invention.

As shown in FIG. 7, the optimum eye position satisfying both LFA of the brightness value and scattering value is presented.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

As discussed so far, the present invention has advantages to effectively determine the optimum eye position from the candidate face image region through a template matching process and the Local Feature Analysis (LFA).

It has a merit to promptly select the similar eye image regions using a template matching process due to the discriminating and compressing of the detected face images.

It has an effect to clearly distinguish between the object image and background image by generating the binary coded image using the two critical values.

It has a merit to minimize the effect of background illumination during the template matching process by performing the specified histogram.

What is claimed is:

1. A method for identifying a person by using a detected eye image, the method comprising steps of:
   discriminating an image, this is differentiated between a detected personal image and a background scene,
   compressing the discriminated image to one-seventh of its original size,
   decoding the compressed image into a binary-code image by utilizing multi-critical values,
   defining a bright portion of the binary-code image for a searching region,
   generating a histogram for a surveying region,
   comparing a specified histogram of the searching region with various templates to sort-out a similar facial regions and select at least one similar eye region among the similar facial regions, and
   determining an eye position, this is closely matched among the selected similar eye regions through a characteristic analysis.

2. The method for identifying a person as claimed in claim 1, wherein said decoding process further comprising sub-steps of:
- setting a critical value "1" for pixel 10, and the critical value "2" for pixel 30, for decoding the binary-code,
- analyzing an absolute value of each pixel for the discriminated image,
- setting an output pixel value "0, " if the pixel value is between the critical value "1", setting the output pixel value "128," if the pixel value is between the critical value "1" and "2",
- setting the output pixel value "255," if the pixel value is above the critical value "2",
- re-assigning the pixel value either "0" or "255" for the pixel value "128", according to a result of image analysis of surrounding components,
- decoding the binary-code for regions having a pixel energy value between the pixel value "0" or "255", and
- calculating a distance between a starting point and an ending point, which has the pixel value "255" in the searching region, excluding regions where the counted pixel values exceed a preset number and selectively determining the searching region.

3. The method for identifying a person as claimed in claim 1, wherein said comparing process further comprising sub-steps of:
- selecting a group of candidate face regions, which are containing similar face images, by using various template sizes,
- eliminating pixels disposed outside boundary, which are not necessary for comparing the face image, which are two rows and two columns of pixels at the periphery of the face image region from the selected face image of the candidate regions, and two by two pixels of leftmost and rightmost of the face image region with respect to the central axis of the selected face image of the candidate regions,
- selecting a darkest pixel of symmetrical portion between left and right face image,
- determining the candidate eye position by restoring the original eye image position,
- calculating a distance between the left and right eyes in the pixel by analyzing the eye position of the candidate, and
- determining an optimum eye position by proportionally adjusting the distance of the left and right eye image regions.

4. The method for identifying a person as claimed in claim 1, wherein said determining process further comprising sub-steps of:
- calculating an average value of brightness for a candidate eye region having 5×5 pixels and mound eye center position,
- evaluating the average value of the brightness for a surrounding regions, having 5 pixels apart around the eye center position of 5×5 block,
- analyzing the average value of the brightness for all other candidate eye regions,
- calculating a light scattering value at each row and column of the candidate eye regions,
- estimating an overall average light scattering value,
- analyzing the light scattering values for all other candidate eye regions,
- determining an optimum eye position among the candidate eye regions based on the Local Feature Analysis (LFA), which has a resulting value of the brightness less than average value of the surrounding blocks and the highest scattering value.

* * * * *